Patented Dec. 27, 1949

2,492,633

UNITED STATES PATENT OFFICE 2,492,633

PREPARING HALOTHIOPHENES

Howard D. Hartough, Pitman, N. J., assignor to Socony-Vacuum Oil Company, Incorporated, a corporation of New York No Drawing. Application January 24, 1947, Serial No. 724,245

9 Claims. (Cl. 260—329)

This invention relates to a process for preparing pure halogenated derivatives of thiophene or alkylthiophenes. More particularly, the present invention is directed to a method for preparing pure chlorothiophenes, bromothiophenes, and alkyl derivatives thereof.

The direct reaction between thiophene and halogens, such as chlorine or bromine, is well known in the art and proceeds easily and rapidly under normal conditions to yield a thiophene-halogen reaction mixture comprising unreacted thiophene, monohalogenated thiophene and various polyhalogenated thiophenes, the proportion of each being commensurate with the particular degree of halogenation involved. Thus, in the reaction of thiophene with chlorine, chloro-substituted thiophenes obtained in admixture have included 2-chlorothiophene, 2,5-dichlorothiophene, 2,3,5-trichlorothiophene and 2,3,4,5-tetrachlorothiophene. The amounts of the various chlorothiophenes obtained, along with the amount of unreacted thiophene which can be recovered, is dependent upon the conditions under which the chlorination is effected and particularly upon the relative proportions of thiophene and chlorine which are brought into contact.

Attempts in the past to separate the resulting thiophene-chlorine reaction mixture into the various chlorothiophenes by fractional distillation thereof have lead to the evolution of hydrogen chloride in considerable quantity and the chlorothiophenes so obtained, if any, were not pure. To obtain pure chlorothiophenes, the original method, developed over sixty years ago and accredited to Victor Meyer, has heretofore generally been employed. This method involves heating the crude chlorination reaction mixture with alcoholic potassium hydroxide for several hours to destroy hydrogen chloride addition products, followed by precipitation of a mixture of the chlorothiophenes therefrom with water and subsequent steam distillation and fractionation of the mixture so obtained to yield the various chlorothiophenes. A similar method has likewise been employed for the purification of the reaction product of thiophene with bromine.

The above described process, while yielding pure chlorothiophenes, has certain inherent disadvantages which render it inapplicable for the production of chlorothiophenes in commercial quantities. Foremost of these disadvantages is the excessively long heating time of the crude chlorinated thiophene mixture with alcoholic potassium hydroxide. This heating period requires several hours, depending upon the extent to which the thiophene has been chlorinated; mixtures which have been heavily chlorinated require a correspondingly longer time of treatment. Under ordinary conditions of chlorination, the resulting thiophene-chlorine reaction mixture frequently requires a heating period with alcoholic potassium hydroxide of the order of one day or longer in order to insure the complete removal of acid products therefrom. With a comparatively higher degree of chlorination, the necessary treating period with alcoholic potassium hydroxide may extend to several days. Thus, the process heretofore used for obtaining pure chlorothiophenes has been a slow, time-consuming operation. It is evident that such a process does not readily lend itself to a commercially feasible method for producing pure chlorothiophenes. In addition to being a slow, drawn-out operation, the aforementioned procedure, when carried out on a commercial basis, is unattractive from an economical point of view, since the loss of alcohol or the expense of recovering alcohol from the spent potassium hydroxide solution would greatly increase the overall cost of production. Furthermore, the excessive amount of fuel consumed during the extended heating period of the thiophene-chlorine reaction mixture with alcoholic potassium hydroxide and the labor costs which would be involved during said period render the process totally inadequate as an efficient commercial method for preparing pure chlorothiophenes.

In accordance with the present invention, there has now been discovered a method of preparing pure halogenated thiophenes which overcomes the disadvantages inherent in the process heretofore employed. Broadly stated, the process contemplated herein comprises bringing the crude halogen-thiophene or halogen-alkylthiophene reaction mixture into contact with an aqueous alkaline solution (steam-distilling the resulting solution to yield a distillate composed of a water layer and an organic layer, separating the two layers and distilling the organic layer so obtained to effect a fractionation thereof into the various halogenated thiophene derivatives.

It has been found that by carrying out the treatment of crude thiophene-chlorine or thiophene-bromine reaction mixtures according to the above procedure, the excessively long heating periods, such as have heretofore been necessary with the use of alcoholic potassium hydroxide, can be substantially eliminated. The various halogenated thiophenes obtained as a result of the procedure described herein are of a high degree of purity and the process of their preparation represents an efficient, comparatively rapid method in comparison with the time-consuming process of the prior art. Moreover, the method of this invention is a simple procedure for preparing pure chlorinated or brominated thiophenes and is particularly applicable to operations on a large scale, since the economics of the process are extremely attractive. Thus, the method described herein eliminates the use of alcohol, heretofore deemed essential for preparing the potassium hydroxide solution used in the prior art procedure, and consequently dispenses with the need of a recovery system for said alcohol. Also, the process of this invention permits a much greater amount of the pure bromo- or chlorothiophenes to be obtained in a given time as compared with the method heretofore employed. This, in turn, causes a substantial reduction in the expenditure required per unit of pure halothiophene obtained and hence gives rise to a highly economical and efficient method of production.

It is accordingly an object of the present invention to provide an effective process for preparing pure bromo- or chlorothiophenes. Another object is the provision of a process for preparing pure bromo- or chlorothiophenes wherein the extensive heating period necessary to the prior art procedure can be substantially eliminated to provide a rapid, efficient process. A still further object is to afford a process for preparing pure bromo- or chlorothiophenes or alkyl derivatives thereof which is adaptable for commercial production. A very important object is the provision of an economical, rapid, effective method for obtaining pure halogenated derivatives of thiophene or alkylthiophenes from crude reaction mixtures thereof.

These and other objects which will be recognized by those skilled in the art are attained in accordance with the present invention wherein pure halogenated thiophenes or alkylthiophenes are obtained by contacting the crude mixture resulting upon the bromination or chlorination of thiophene or an alkylthiophene with an aqueous alkaline solution, and thereafter steam-distilling the resulting solution. The distillate so obtained, composed of a water phase and organic phase, is then separated, and the isolated organic phase fractionated to yield the various halogen derivatives present in substantially pure form.

As pointed out above, the relative amounts of each of the particular chlorothiophenes or bromothiophenes obtained will depend to a large extent upon the degree to which the thiophene is halogenated. Generally speaking, varying amounts of the mono-, di-, tri- and tetrahalogenated derivatives will be obtained under practically all conditions. With a small degree of chlorination or bromination, however, the 2-halogenated derivative will be the predominant halogen product. When relatively larger amounts of chlorine or bromine are contacted with thiophene, the 2,5 product is obtained in substantial yield along with the 2-halogenated product. As a general rule, as the degree of halogenation is increased, the yields of tri- and tetrahalogenated thiophenes correspondingly increase in proportion to the amounts of the mono- and di-substituted halogen derivatives. It will thus be understood that the relative amounts of each of the chlorinated or brominated derivatives of thiophene obtained in accordance with the method contemplated herein will largely depend upon the conditions under which the initial halogenation reaction is carried out. Under the usual conditions, thiophene and halogen are contacted at atmospheric pressure and at room temperature or slightly higher. The temperature at which halogenation is effected will be below the boiling point of thiophene or alkylthiophene being treated. Thus, in the chlorination or bromination of thiophene, the reaction temperature will generally be between about 0° C. and about 80° C. and more often between about 15° C. and about 50° C. The halogenation of thiophene may be carried out in any suitable manner wherein the thiophene and halogen are brought into intimate contact. Generally, the gaseous halogen will be bubbled into thiophene or alkyl derivative thereof at a rate which will insure thorough mixing and contact of the two reactants.

The resulting crude chlorination or bromination reaction mixture is then slowly added to an aqueous alkaline solution. Generally, any of the commonly employed alkalis which are substantially soluble in water can be used for this purpose. For practical purposes, however, alkali metal compounds and alkaline earth compounds will ordinarily be employed. Representative of the aqueous alkaline solutions used are the hydroxides and weak acid salts of the alkali and alkaline earth metals in particular, sodium hydroxide, sodium carbonate, potassium hydroxide, potassium carbonate, calcium hydroxide and barium hydroxide. The concentration of the particular alkaline solution employed will vary with the initial degree of halogenation and generally the heavily halogenated thiophene mixtures will require a more concentrated alkaline solution to completely remove acidic materials therefrom. It will accordingly be understood that the concentration of the aqueous alkaline solution employed herein may vary to a considerable extent, depending upon the proportion of acidic material present in the crude mixture resulting from the halogenation of thiophene or alkylthiophene. It will further be understood that the strength of the alkaline solution will be such as to remove completely the acidic material from the crude halogenation mixture.

The mixture resulting upon addition of the halogen-thiophene reaction mixture to the aqueous alkaline solution is then subjected to steam distillation. The steam distillate obtained as a result of said distillation consists of an organic layer and an overlying water layer. The two phases are suitably separated by mechanical means. In some instances, the organic layer so obtained is desirably dried to remove traces of water therefrom before being subjected to fractionation. Under some circumstances, it may be desirable to carry out the fractionation of the organic steam distillate over alkalis, such as sodium or potassium hydroxide, as a further precaution in removing all traces of hydrogen halide from the distillate. However, in employing the above described technique, fractionation over alkalis will not generally be found necessary. Upon fractionation of the organic steam distillate, any unreacted thiophene present is recovered and may be re-used for further halogenation. The halogenated products obtained by fractionation include the mono-, di-, tri- and tetrahalogenated thiophenes in substantially pure form.

The above described process may be used in preparing pure 2-chlorothiophene, 2,5-dichlorothiophene, 2,3,5-trichlorothiophene, 2,3,4,5-tetrachlorothiophene, 2-bromothiophene, 2,5-dibromothiophene, 2,3,5-tribromothiophene and 2,3,4,5-tetrabromothiophene. By employing an alkyl derivative of thiophene, such as methyl, ethyl, propyl, butyl, etc., derivatives, the corresponding pure chloro- or bromo-compounds can be prepared. Thus, the process of this invention contemplates the preparation of pure 2-methyl-5-chlorothiophene; 2-methyl-5-bromothiophene; 2-methyl-3,5-dichlorothiophene; 3-methyl-2,5-dichlorothiophene; 3-methyl-2,4,5-trichlorothiophene; 2-ethyl-5-chlorothiophene; 2-ethyl-3,4,5-trichlorothiophene; 3-ethyl-2,5-dichlorothiophene; 2-propyl-5-bromothiophene; 2-propyl-3,4,5-trichlorothiophene, and the like.

The following examples will serve to illustrate the method of this invention without limiting the same:

Example 1

Three thousand grams of thiophene (35.7 moles) were reacted at a temperature of 15–47° C. with gaseous chlorine until the total weight of the reaction mixture was 4,437 grams. The thiophene-chlorine reaction mixture so obtained was added to 500 milliliters of a 20 per cent by weight aqueous sodium carbonate solution and steam-distilled until the temperature of the distilling gases reached 100° C. The resulting organic distillate was separated from water, dried over sodium sulfate and fractionated to give the following:

| | Per cent |
|---|---|
| 447 grams thiophene (recovered) | 15 |
| 1514 grams 2-chlorothiophene | 36 |
| 337 grams 2,5-dichlorothiophene | 6 |

Yields were based on the weight of thiophene used.

Example 2

One thousand two hundred sixty-two grams of thiophene (15 moles) were reacted at a temperature of 30–40° C. with gaseous chlorine until the weight of the reaction mixture was 2,347 grams. The chlorine was measured by a rotameter and the amount of chlorine added was equivalent to 1.86 moles of chlorine per mole of thiophene. Approximately one-half of the thiophene-chlorine reaction product mixture was distilled until the vapor temperature reached 195° C. The resulting distillate was then steam-distilled from an aqueous 20 per cent by weight solution of sodium carbonate. The organic steam distillate was separated from water, dried over sodium sulfate and fractionated to give the following:

| | Per cent |
|---|---|
| 2 grams thiophene | -- |
| 175 grams 2-chlorothiophene | 20 |
| 564 grams 2,5-dichlorothiophene | 49 |
| 136 grams 2,3,5-trichlorothiophene | 10 |

Yields were based on the weight of thiophene used.

The results obtained in accordance with the above examples are to be contrasted with the procedure heretofore employed as illustrated by the following:

Example 3

One thousand six hundred eighty-three grams of thiophene (20 moles) were reacted at a temperature of 25–35° C. with gaseous chlorine until the weight of the reaction mixture was 2,495 grams. The chlorine was measured by a rotameter and the amount of chlorine added was equivalent to 1 mole of chlorine per mole of thiophene. Four hundred grams of the resulting thiophene-chlorine reaction product mixture were heated under reflux with stirring with 1000 grams of a 10 per cent alcoholic potassium hydroxide solution for a period of 24½ hours. The precipitated salt obtained was removed by filtration. The resulting filtrate was diluted with water and the organic material which separated was removed. The remaining water layer was extracted twice with petroleum ether and the extracts so obtained were added to the organic material. The organic materials were then dried over sodium sulfate and fractionated to give the following:

| | Per cent |
|---|---|
| 40 grams thiophene (recovered) | 14 |
| 162 grams 2-chlorothiophene | 43 |
| 70 grams 2,5-dichlorothiophene | 14 |

Yields were based on the weight of thiophene used.

It is to be noted, in comparing the results of the examples illustrating the method of the present invention with the process previously used as illustrated by Example 3, that in order to obtain substantially the same yields of products, it was necessary in using the prior art method to treat the crude chlorination mixture with alcoholic potassium hydroxide for over 24 hours. This excessively long heating period has been eliminated by the method of this invention, thereby providing a more rapid and efficient procedure for preparing pure chlorothiophenes than has heretofore been known.

I claim:

1. A method of preparing pure halogenated derivatives of a material selected from the group consisting of thiophene and alkylthiophene, comprising contacting said material with a halogen selected from the group consisting of chlorine and bromine, adding the resulting halogenated mixture to an aqueous alkaline solution, the alkali concentration of which is sufficient to remove completely acidic material from said halogenated mixture, immediately steam-distilling said solution, separating the water phase of the resulting distillate from the organic phase and fractionating said organic phase to yield pure halogenated derivatives.

2. A method of preparing pure halogenated derivatives of a material selected from the group consisting of thiophene and alkylthiophene, comprising contacting said material with a halogen selected from the group consisting of chlorine and bromine, adding the resulting halogenated mixture to an aqueous alkaline solution, the alkali concentration of which is sufficient to remove completely acidic material from said halogenated mixture, immediately steam-distilling said solution, separating the water phase of the resulting distillate from the organic phase, drying said organic phase and fractionating to yield pure halogenated derivatives.

3. A method of making pure chlorothiophenes, comprising contacting a material selected from the group consisting of thiophene and alkylthiophene with chlorine, adding the resulting chlorinated mixture to an aqueous alkaline solution, the alkali concentration of which is sufficient to remove completely acidic material from said chlorinated mixture, immediately steam-distilling said solution, separating the water phase of the resulting distillate from the organic phase and fractionating said organic phase to yield pure chlorinated derivatives.

4. A method of making pure bromothiophenes, comprising contacting a material selected from the group consisting of thiophene and alkylthiophene with bromine, adding the resulting brominated mixture to an aqueous alkaline solution, the alkali concentration of which is sufficient to remove completely acidic material from said brominated mixture, immediately steam-distilling said solution, separating the water phase of the resulting distillate from the organic phase and fractionating said organic phase to yield pure brominated derivatives.

5. A method of making pure chlorothiophenes, comprising contacting a material selected from the group consisting of thiophene and alkylthiophene with chlorine, adding the resulting chlorinated mixture to an aqueous alkaline solution, the alkali concentration of which is sufficient to remove completely acidic material from said chlorinated mixture, immediately steam-distilling said solution, separating the water phase of the resulting distillate from the organic phase, drying said organic phase and fractionating to yield pure chlorinated derivatives.

6. A method of making pure bromothiophenes, comprising contacting a material selected from the group consisting of thiophene and alkylthiophene with bromine, adding the resulting brominated mixture to an aqueous alkaline solution, the alkali concentration of which is sufficient to remove completely acidic material from said brominated mixture, immediately steam-distilling said solution, separating the water phase of the resulting distillate from the organic phase, drying said organic phase and fractionating to yield pure brominated derivatives.

7. A method of preparing pure chlorothiophenes, comprising contacting thiophene with chlorine, adding the resulting chlorinated mixture to an aqueous alkaline solution, the alkali concentration of which is sufficient to remove completely acidic material from said chlorinated mixture, immediately steam-distilling said solution, separating the water phase of the resulting distillate from the organic phase and fractionating said organic phase to yield pure chlorothiophenes.

8. A method of preparing pure chlorothiophenes, comprising contacting thiophene with chlorine, adding the resulting chlorinated mixture to an aqueous alkaline solution, the alkali concentration of which is sufficient to remove completely acidic material from said chlorinated mixture, immediately steam-distilling said solution, separating the water phase of the resulting distillate from the organic phase, drying said organic phase and fractionating to yield pure chlorothiophenes.

9. A method of preparing pure chlorothiophenes, comprising contacting thiophene with chlorine, adding the resulting chlorinated mixture to an aqueous sodium carbonate solution, the concentration of which is sufficient to remove completely acidic material from said chlorinated mixture, immediately steam-distilling said solution, separating the water phase of the resulting distillate from the organic phase and fractionating said organic phase to yield pure chlorothiophenes.

HOWARD D. HARTOUGH.

REFERENCES CITED

The following references are of record in the file of this patent:

Ber. 17, 794–5 (1884), 19, 650 (1886).

Weygand, "Organic Preparations," page 77, Interscience Publishers, N. Y., 1945.